US011328342B2

(12) United States Patent
Vaughn et al.

(10) Patent No.: US 11,328,342 B2
(45) Date of Patent: May 10, 2022

(54) AI BASED COLLUDED SHIPPING WITH 3D PRINTING

(71) Applicant: Kyndryl, Inc., New York, NY (US)

(72) Inventors: Garfield W. Vaughn, South Windsor, CT (US); Moncef Benboubakeur, Brno (CZ); Julija Narodicka, Brno (CZ); Aaron K. Baughman, Cary, NC (US)

(73) Assignee: Kyndryl, Inc., New York, NY (US)

( * ) Notice: Subject to any disclaimer, the term of this patent is extended or adjusted under 35 U.S.C. 154(b) by 209 days.

(21) Appl. No.: 16/423,369

(22) Filed: May 28, 2019

(65) Prior Publication Data

US 2020/0380587 A1 Dec. 3, 2020

(51) Int. Cl.
| | |
|---|---|
| *G06Q 30/06* | (2012.01) |
| *B33Y 50/02* | (2015.01) |
| *B29C 64/393* | (2017.01) |
| *G06Q 10/06* | (2012.01) |
| *G06T 7/20* | (2017.01) |

(52) U.S. Cl.
CPC ....... *G06Q 30/0635* (2013.01); *B29C 64/393* (2017.08); *B33Y 50/02* (2014.12); *G06Q 10/0639* (2013.01); *G06Q 10/06316* (2013.01); *G06Q 10/063112* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 10,127,564 B2* | 11/2018 | Heath | G06Q 30/02 |
| 2013/0182002 A1* | 7/2013 | Macciola | G06V 10/25 |
| | | | 345/589 |
| 2015/0278598 A1* | 10/2015 | Scott | G06K 19/10 |
| | | | 382/100 |
| 2016/0314704 A1 | 10/2016 | Bell | |
| 2018/0096175 A1* | 4/2018 | Schmeling | G06Q 10/08 |
| 2019/0097808 A1* | 3/2019 | Scott | G06K 19/086 |

FOREIGN PATENT DOCUMENTS

WO    2018225467 A1    12/2018

OTHER PUBLICATIONS

L. Mertz, "Dream It, Design It, Print It in 3-D: What Can 3-D Printing Do for You?," in IEEE Pulse, vol. 4, No. 6, pp. 15-21, Nov. 2013, doi: 10.1109/MPUL.2013.2279616 (Year: 2013).*

(Continued)

*Primary Examiner* — Thomas L Mansfield
(74) *Attorney, Agent, or Firm* — VanLeeuwen & VanLeeuwen; Ken Han

(57) ABSTRACT

An approach is provided in which an information handling system receives a request for a product from a first entity that includes multiple components. The information handling system determines that the components include a set of printable 3D components and a set of non-printable 3D components. Next, the information handling system sends a set of component instructions to a second entity to print the set of printable 3D components and, in turn, sends a set of assembly instructions to the second entity to assemble the product using the set of 3D printable components and the set of non-printable 3D components.

8 Claims, 9 Drawing Sheets

(56) References Cited

OTHER PUBLICATIONS

Leonid, Chepelev, et al. "Medical 3D printing: methods to standardize terminology and report trends." 3D Printing in Medicine 3.1 (2017). (Year: 2017).*
Konnikov, Evgenii A., Olga A. Konnikova, and Dmitriy G. Rodionov. "Impact of 3D-Printing technologies on the transformation of industrial production in the arctic zone." Resources 8.1 (2019): 20. (Year: 2019).*
Rehnberg, Märtha, and Stefano Ponte. "From smiling to smirking? 3D printing, upgrading and the restructuring of global value chains." Global Networks 18.1 (2018): 57-80. (Year: 2018).*
Boon et al., "Influence of 3D printing on transport: a theory and experts judgment based conceptual model," Transport Reviews, vol. 38, No. 5, Aug. 2017, Routledge Taylor & Francis Group, pp. 556-575.
"Five ways 3-D printing is changing manufacturing," PwC, Apr. 2017, 13 pages.
Heutger, "DHL: How 3D printing is disrupting the logistics industry," Digital Supply Chain, Jun. 2017, 13 pages.
De Jong et al., "Innovation Lessons From 3-D Printing," MITSloan Management Review, Winter 2013, vol. 54, No. 2, 12 pages.
Rayna et al., "From rapid prototyping to home fabrication: How 3D printing is changing business model innovation," Technological Forecasting & Social Change, Elsevier, Jan. 2014, 11 pages.

* cited by examiner

AI BASED COLLUDED SHIPPING WITH 3D PRINTING

BACKGROUND

Many industries rely on just in time product deliveries to maintain a viable business. Product delivery times vary based on product supply, source/destination locations, assembly requirements, weather, regulatory restrictions, and etcetera. Industries are also sensitive to shipment costs that add to overall product cost. Product shipment costs are heavily dependent on the size of the packaging, the weight of the package, as well as the value of the content.

"3D" (three dimensional) printing is a relatively new technology that covers a variety of processes in which material is joined or solidified under computer control to create a three-dimensional object. A 3D object is built from a computer-aided design (CAD) model, usually by successively adding material layer by layer. 3D printing differs from conventional machining processes that remove material from a stock item, or the product is created through a casting/forging process. One of the key advantages of 3D printing is the ability to produce very customized, complex shapes or geometries.

3D printing techniques were initially utilized to produce functional or aesthetical prototypes. Today, however, the precision, repeatability, and material range of 3D printing has increased to the point that some 3D printing processes are considered viable as an industrial production technology. The most commonly used 3D printing process is a material extrusion technique called fused deposition modeling (FDM). Metal powder bed fusion has been gaining prominence lately during immense applications of metal parts in the 3D printing industry. In addition, researchers have recently demonstrated a multi-material, vertically integrated printed electronics additive manufacturing platform (VIPRE), which enables 3D printing of functional electronics operating up to 40 GHz. As a result, VIPRE opens up new technology markets to 3D printing partners.

BRIEF SUMMARY

According to one embodiment of the present disclosure, an approach is provided in which an information handling system receives a request for a product from a first entity that includes multiple components. The information handling system determines that the components include a set of printable 3D components and a set of non-printable 3D components. Next, the information handling system sends a set of component instructions to a second entity to print the set of printable 3D components and, in turn, sends a set of assembly instructions to the second entity to assemble the product using the set of 3D printable components and the set of non-printable 3D components.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) receiving, from a first entity, a request for a product that comprises a plurality of components; (ii) determining that the plurality of components comprise a set of printable 3D components and a set of non-printable 3D components; (iii) sending a set of component instructions to a second entity to print the set of printable 3D components; and (iv) sending a set of assembly instructions to the second entity to assemble the product using the set of 3D printable components and the set of non-printable 3D components.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
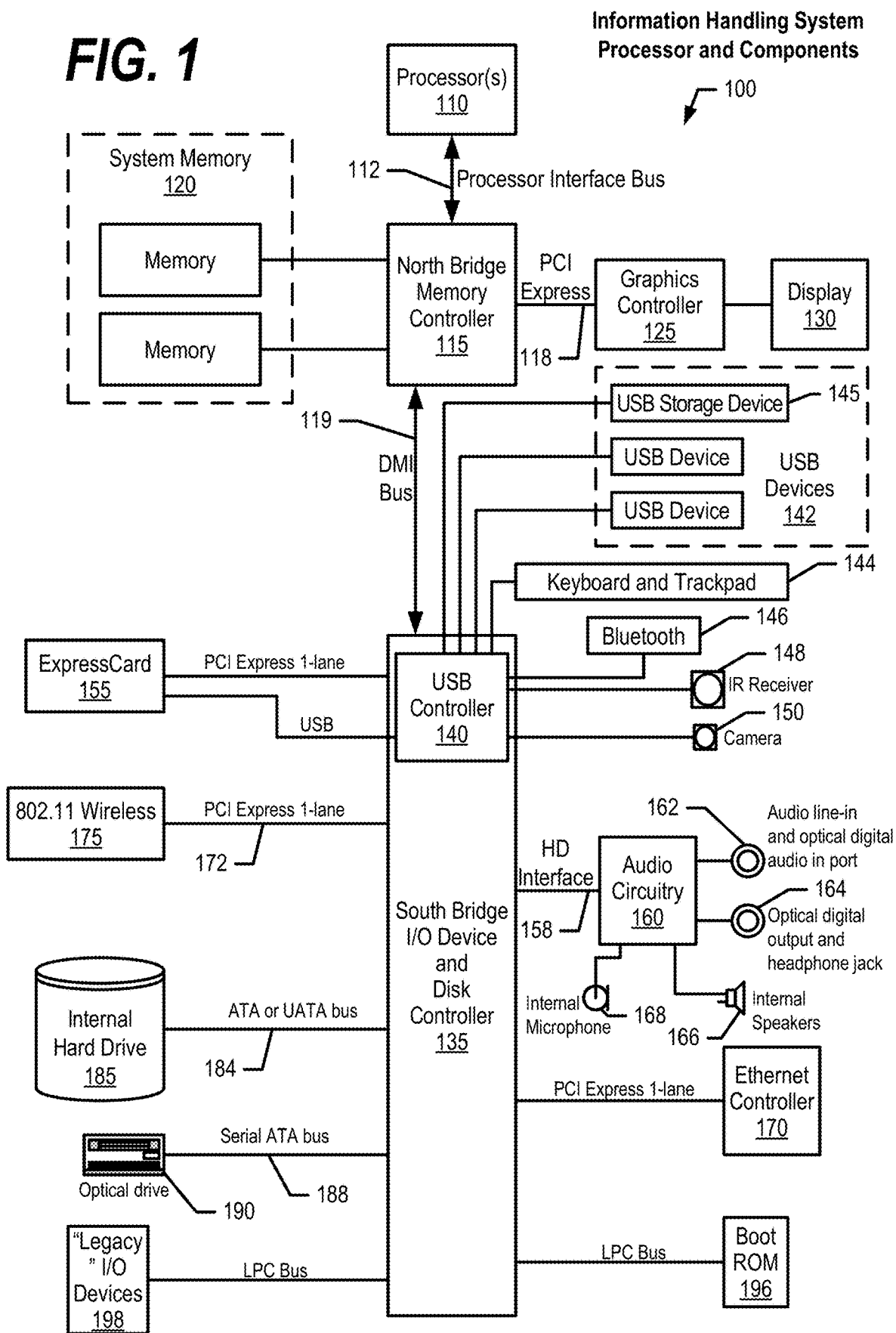
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device.

Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
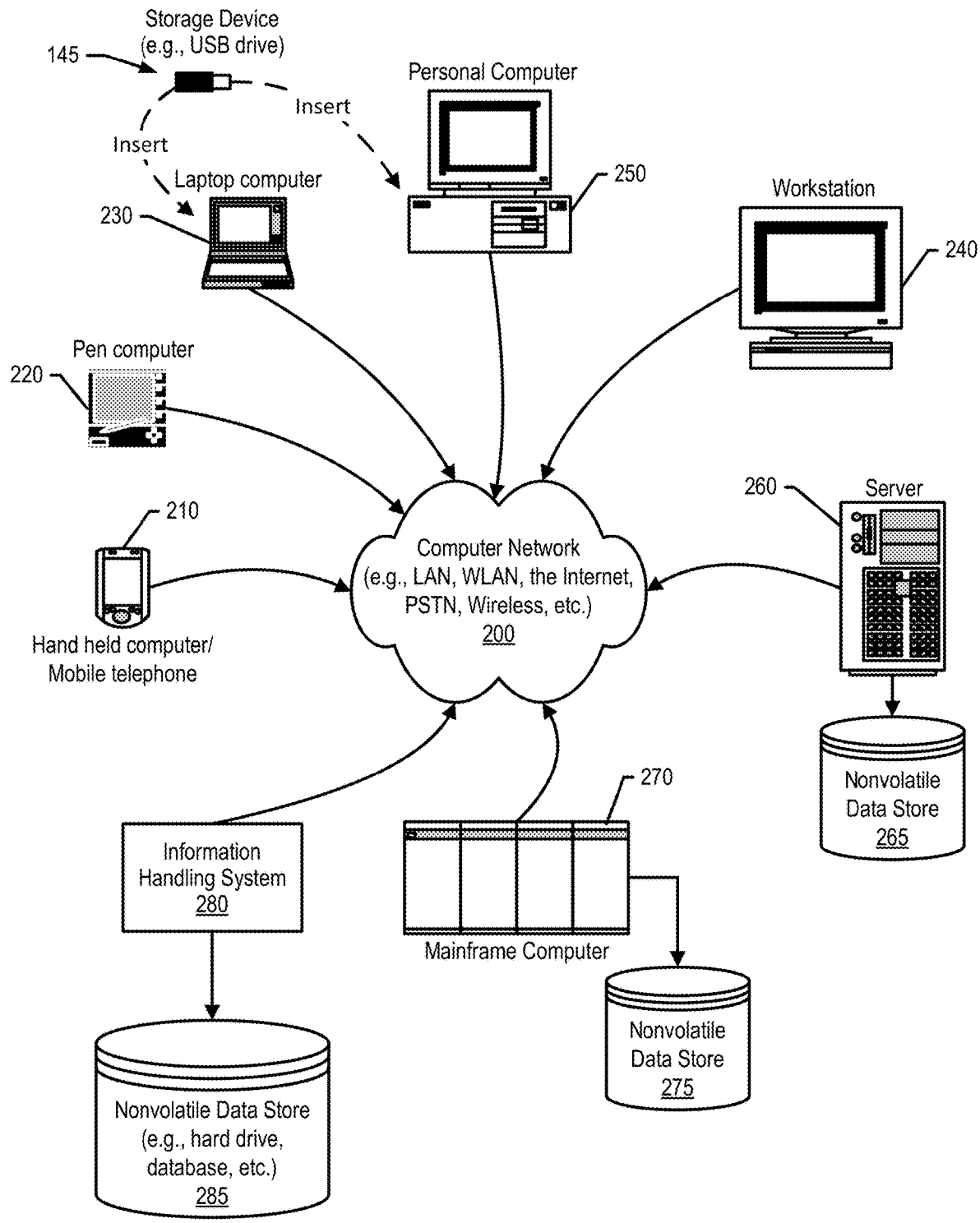
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, the cost to ship products is heavily dependent on the size of the packaging, the weight of the package, the value of the content, the source location, the destination location, regulatory restrictions, and etcetera. FIGS. 3 through 9 depict an approach that enables a cognitive agent to separate a product order into a set of printable 3D components and a set of non-printable 3D components. Then, the cognitive agent sends an order for the printable 3D components to a 3D printing partner based on various criteria such as the 3D printing partner's location relative to the customer, the 3D printing partner's assembly skills, and etcetera. In turn, the 3D printing partner receives the set of non-printable 3D components from a manufacturer, prints the set of printable 3D components, and assembles the product using the non-printable 3D components and the printable 3D components. As discussed herein, an entity may be the company, the 3D printing partner, and/or the customer.

As discussed herein, the approach has several advantages over prior solutions. In one embodiment, the approach moves the product assembly closer to the customer to reduce shipping costs by selecting a 3D printing partner in proximity to the customer. In another embodiment, the approach provides an amorphous supply chain link learning based on on-demand 3D printing feedback. In yet another embodiment, the approach provides a customer 3D printing assembly learning model in the context of assembled parts. In yet another embodiment, the approach provides genetic migration of skills weights based on customer 3D printing assembling. In yet another embodiment, the approach provides a customer 3D printing node emergence within the supply chain (e.g., the client becomes a supplier). In yet another embodiment, the approach provides a 3D printing queue forecasting for on-demand distributed parts generation.

Figure 3:
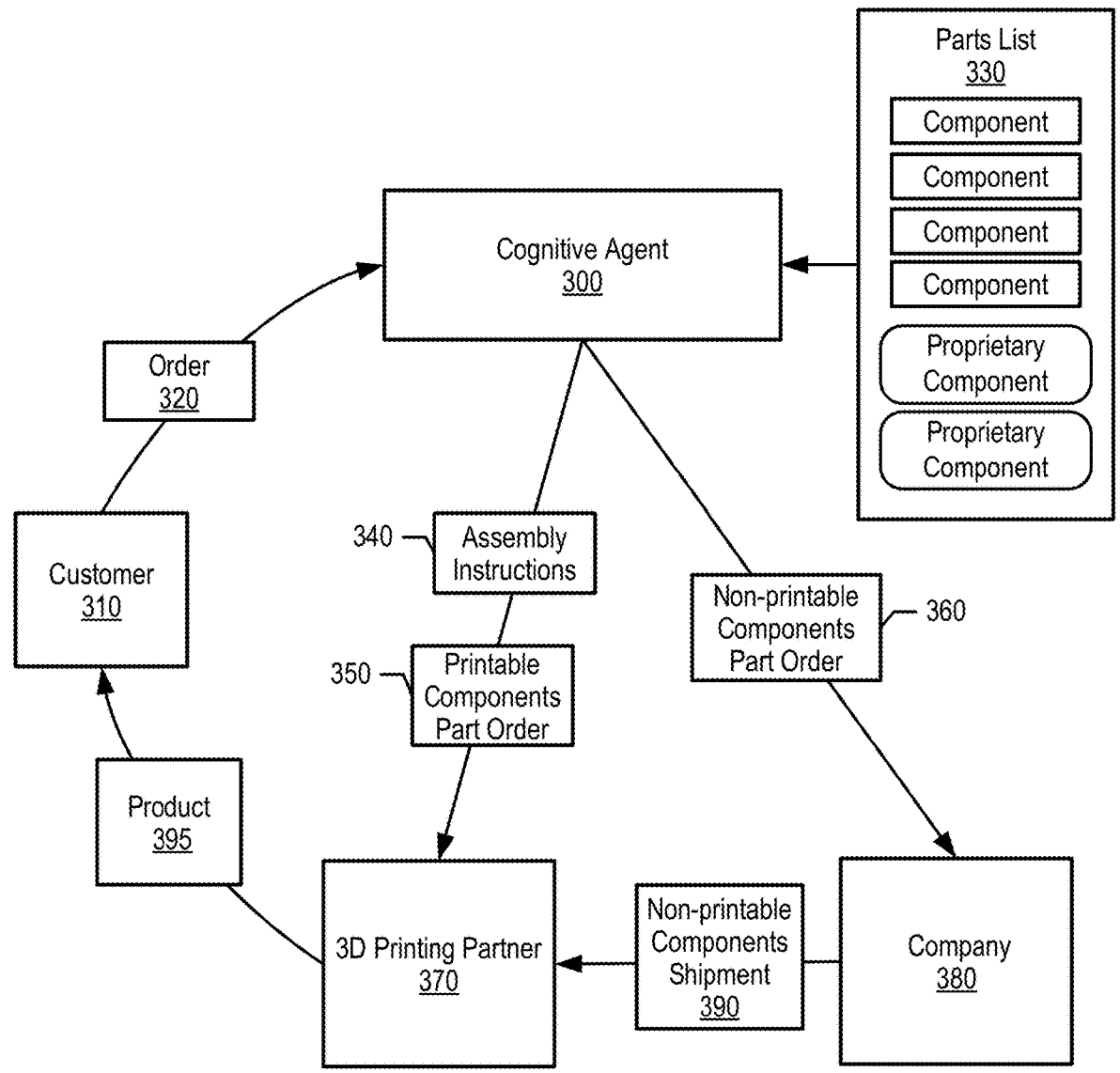
FIG. 3 is an exemplary diagram depicting a cognitive agent fulfilling a product order by selecting a viable 3D printing partner to "print" a portion of product components and assemble the product to ship to a customer.

FIG. 3 is an exemplary diagram depicting a cognitive agent fulfilling a product order by selecting a viable 3D printing partner to "print" a portion of product components and assemble the product to ship to a customer. In one embodiment, cognitive agent 300 functions as an intermediary between customers (customer 310), companies (company 380), and 3D printing partners (3D printing partner 370). Cognitive agent 300 may be located inside company 380 or may be an autonomous service in the cloud, for example, that employs a pay as you go model.

Cognitive agent 300 receives order 320 from customer 310. Cognitive agent 300 locates parts list 330, which is a parts list corresponding to a product included in order 320. In one embodiment, cognitive agent 300 obtains parts list 330 from one or more sources such as a historical database, from customer 310, from a cloud-based database, and etcetera.

Cognitive agent 300 identifies which components in parts list 330 are 3D printable and which of the components are not printable, such as proprietary components, components with unique properties that are not printable, and etcetera. The example in FIG. 3 shows that parts list 330 includes six components, two of which are proprietary components. Cognitive agent 300 selects 3D printing partner 370 based on several criteria such as location, 3D printing capabilities, regulations, assembly skills, sociopolitical events, environmental conditions, and etcetera (see FIGS. 4, 5, 9, and corresponding text for further details).

Next, cognitive agent 300 sends printable components part order 350 to the selected 3D printing partner 370 along with product assembly instructions 340. Cognitive agent 300 also sends non-printable components part order 360 to company 380, which includes, for example, the proprietary components and shipment instructions to ship the components to 3D printing partner 370. In turn, company 380 sends non-printable components shipment 390 to 3D printing partner 370, possibly saving a tremendous amount of overall shipping costs when 3D printing partner 370 is in geographical proximity to customer 310. For example if the final product is a large server but the large server only has a few proprietary components, company 380 sends the few proprietary components to 3D printing partner 370 (non-printable components shipment 390) and 3D printing partner 370 prints the remaining components (e.g., housing), assembles the server, and delivers the server (product 395) to customer 310.

Figure 4:
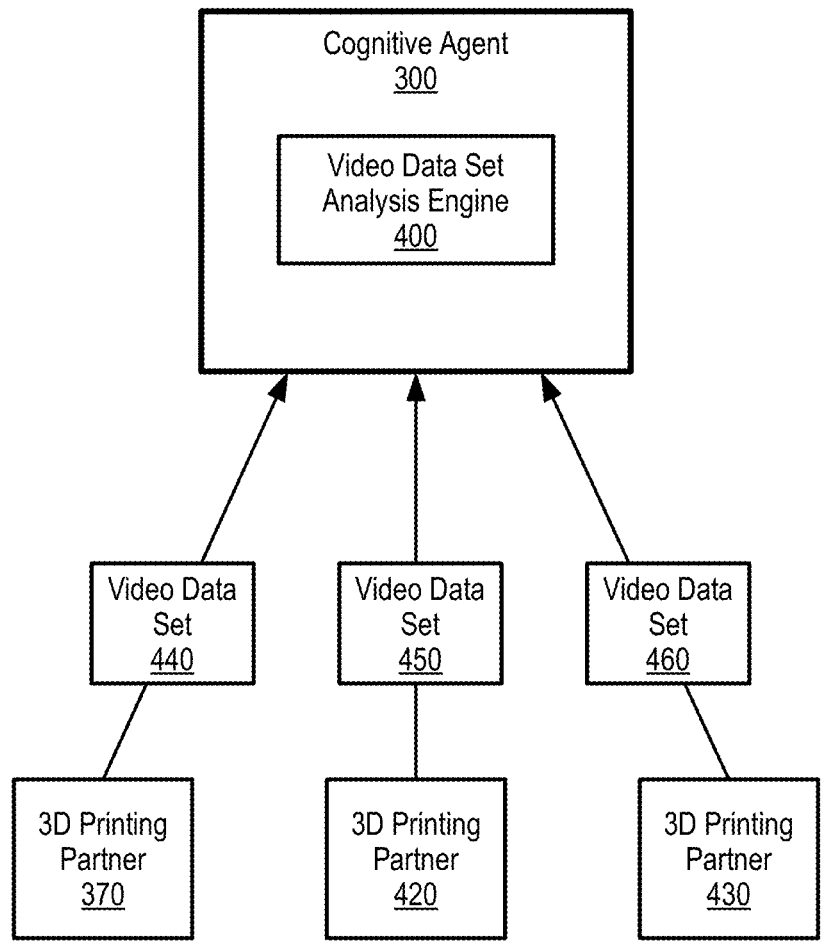
FIG. 4 is an exemplary diagram depicting a cognitive agent evaluating video data sets from 3D printing partners to assess their assembly skill levels.

FIG. 4 is an exemplary diagram depicting cognitive agent 300 evaluating video data sets from 3D printing partners to assess their assembly skill levels. Cognitive agent 300 includes video data set analysis engine 400, which evaluates video data sets 440, 450, and 460 received from 3D printing partners 370, 420, and 430, respectively. The video data sets, in one embodiment, are videos of personnel/machines that are assembling products at their corresponding 3D printing partner. In another embodiment, cognitive agent 300 receives quality assurance information from the 3D printing partners and uses the quality assurance information as a basis for ranking the 3D printing partners.

In one embodiment, video data set analysis engine 400 uses a convolutional neural network along with a deep learning long short-term memory (LSTM) artificial recurrent neural network (RNN) architecture to trend learning over time. Video data set analysis engine 400 analyzes the video data sets and ranks each of 3D printing partners' assembly capabilities. For example, video data set analysis engine 400 may rank capabilities based on speed, precision, attempts, parts selection (e.g., amount of times the correct part was selected on the first selection), and etcetera. In another embodiment, video data set analysis engine 400 evaluates the assembly videos and applies relevant skill sets to a robotics assembly knowledge base, such as to understand a level of expertise, quality of product, and production rates.

Figure 5:
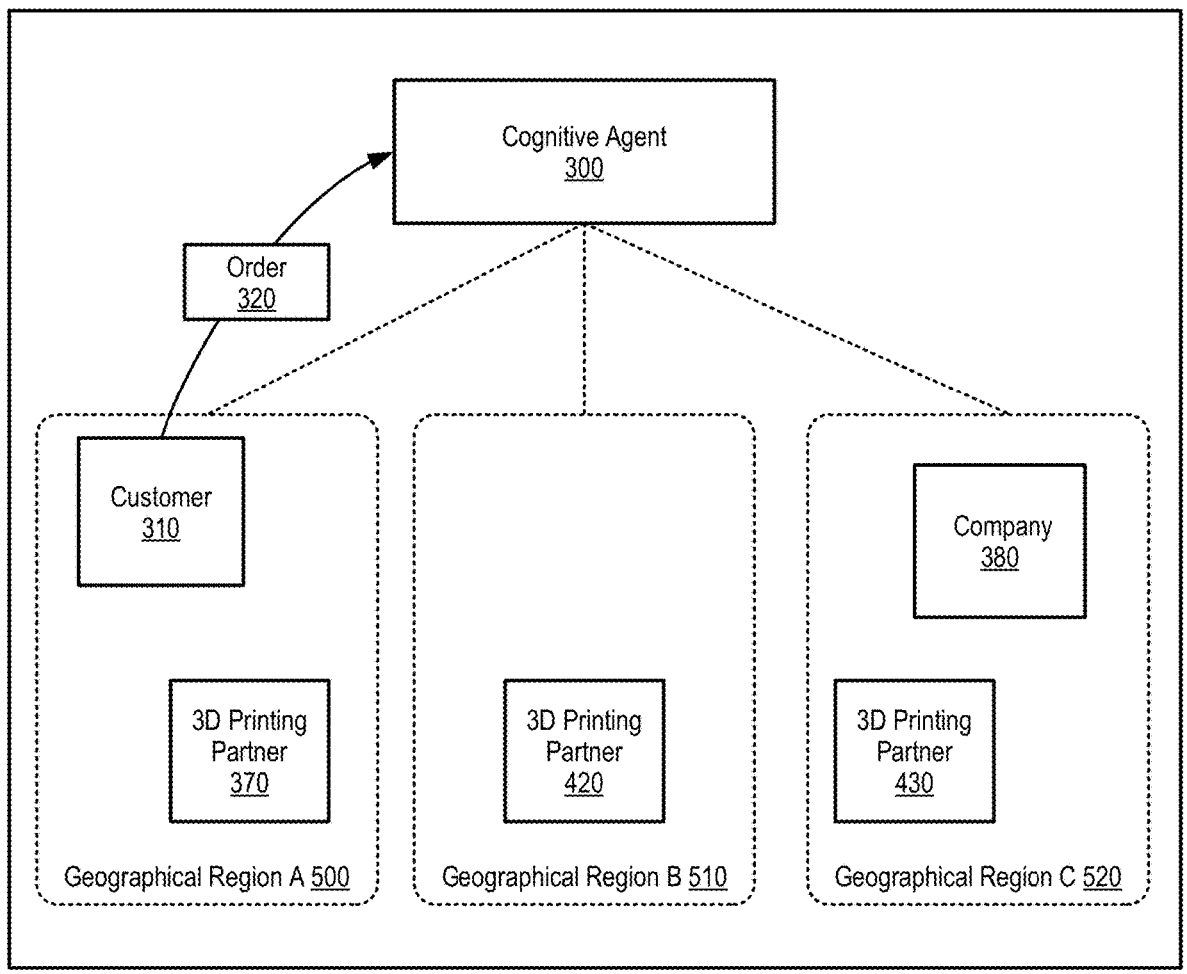
FIG. 5 is an exemplary diagram depicting a cognitive agent selecting a 3D printing partner based, in part, on their geographical region relative to the customer and/or company.

FIG. 5 is an exemplary diagram depicting cognitive agent 300 selecting a 3D printing partner based, in part, on their geographical region relative to the customer and/or company. Cognitive agent 300 receives order 320 from customer 310, which is located in geographical region A 500 (e.g., United States). Order 320 is for a product produced by company 380, which is located in geographical region C 520 (e.g., Germany).

Cognitive agent 300 analyzes order 320 and determines that each of 3D printing partners 370, 420, and 430 are viable partners to receive non-printable components from company 380, assemble the product, and ship the product to customer 310. After analyzing cost and time factors such as shipping regulations, import/export taxes, shipping bottlenecks, etc., cognitive agent 300 selects one of 3D printing partners 370, 420, or 430. For example, cognitive agent 300 may determine that the best approach to minimize shipping cost is for company 380 to ship non-printable components to 3D printing partner 370 and have 3D printing partner 370 assemble and ship the product to customer 310 because 3D printing partner 370 is closest to customer 310.

In another example, cognitive agent 300 may determine that a substantial amount of regulations are in place to ship individual proprietary components from geographical region C 520 to geographical region A 500, but minimal regulations exist to ship a finish product from geographical region C 520 to geographical region A 500. In this example, cognitive agent 300 may determine that 3D printing partner 430 has a cost effective printing and assembly process, and that an optimum solution is to ship non-printable components from company 380 to 3D printing partner 430 and have 3D printing partner 430 ship the finished product to customer 310.

In yet another embodiment, cognitive agent 300 may determine that incentives are in place to utilize companies in geographical region B 510 (e.g., Canada). In this example, cognitive agent 300 may determine that an optimum overall solution is to ship non-printable components from company 380 to 3D printing partner 420 and have 3D printing partner 420 print the printable 3D components, assemble the product, and ship the finished product to customer 310.

Figure 6:
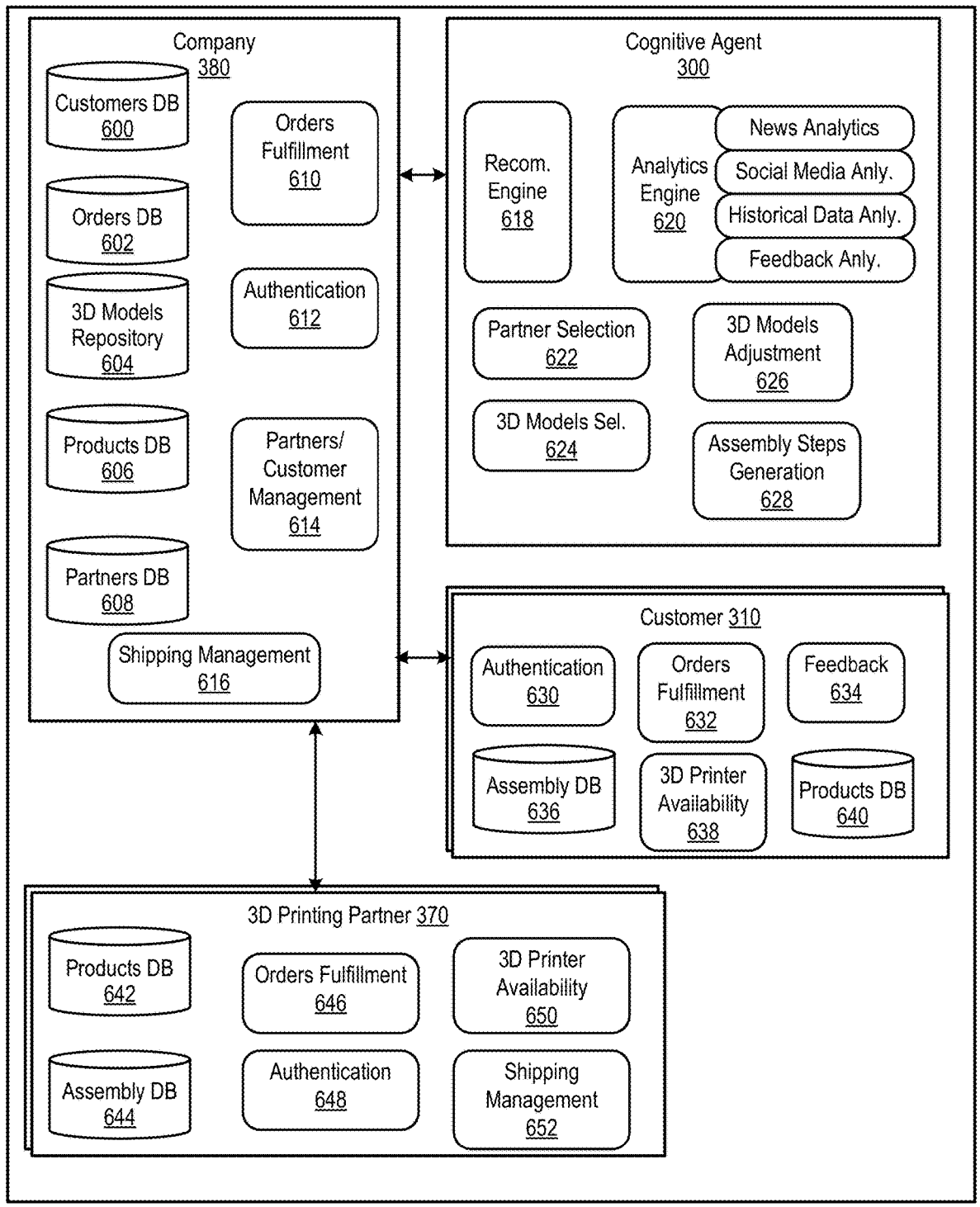
FIG. 6 is an exemplary diagram showing various modules utilized by the entities discussed herein.

FIG. 6 is an exemplary diagram showing various modules utilized by the entities discussed herein. FIG. 6 depicts an example of cognitive agent 300 interfacing with company 380 while company 380 interfaces directly with customer 310 and 3D printing partner 370. Cognitive agent 300, in one embodiment, includes one or more of the following modules:

Recommendation engine 618: Recommends an overall approach to fulfill an order based on various factors discussed herein.

Analytics Engine 620: Performs analytics on trending events, historical information, and customer/supplier feedback.

Partner Selection 622: Works in conjunction with recommendation engine 618 to select a 3D printing partner to fulfill an order.

3D Models Selection 624: Identifies printable 3D components and manages their files (e.g., CAD files).

3D Models Adjustment 626: Adjusts 3D models when required based on 3D printing partner feedback, customer feedback, industry feedback, and etcetera.

Assembly Steps Generation 628: Manages assembly steps for various products that are sent to 3D printing partners.

Company 380, in one embodiment, includes one or more of the following modules:

Customers database 600: A records list of company 380's customers.

Orders database 602: A list of 3D printing requests sent to customers or to 3D printing partners.

3D models repository 604: Printable component models and their corresponding 3D printer files.

Products Database 606: A list of products available for sale to customers and the reference to the 3D models needed to build the products. Includes parts list that indicate printable components.

Partners Database 608: A list of local and global 3D printing partners available to print/assemble/deliver a product to customers.

Orders Fulfillment 610: Manages the list of jobs associated with a product.

Authentication 612: Provides company 380 with a secure access to 3D printers at a customer facility and/or 3D printing partner facility. This allows company 380 to directly print their 3D models without exposing their intellectual property to a 3D printing partner or customer.

Partners/Customer Management 614: Analyzes feedback from customers and from 3D printing partners. Also analyzes shipping speed, quality of the printed models and customer satisfaction.

Shipment Management 616: Manages shipments to customers.

3D printing partner 370, in one embodiment, includes one or more of the following modules:

Products Database 642: Stores tracking information of products to be delivered to customers and whether each component is received to assemble the product.

Assembly Database 644: Assembly instructions to assemble a product. Additionally, robotic components use the instructions to assemble the received components and the 3D printed components.

Orders Fulfillment 646: Manages the list of jobs that are each associated with a product.

Authentication 648: Allows company 380 to have secure access to 3D printing partner 370's 3D printers. This allows company 380 to directly print their 3D models without exposing their intellectual property to 3D printing partner 370.

3D Printer Availability 650: Each 3D printing partner manages their 3D printers, such as when they are booked, by which company, and which components are being printed. Knowing all this information, 3D printing partner 370 shares its queue with the companies willing to use its services so the companies recognize the size of 3D printing partner 370's printing queue and the companies know anticipated lead times.

Shipping Management 652: Analyzes feedback from customers and from 3D printing partners. Also analyzes shipping speed, quality of the printed models and customer satisfaction. Each 3D printing partner also analyzes the quality of its 3D printed models, feedback from customers, time to print and assemble each product, length of the printing queue, etc.

Customer 310, in one embodiment, has the capability to 3D print components and assemble the products. In this embodiment, customer 310 includes one or more of the following software components:

Authentication 630: Provides company 380 with a secure access to customer 310's 3D printers. This enables company 380 to directly print their 3D models at customer 310's facility without exposing their intellectual property to customer 310.

Orders Fulfillment 632: Manages the list of jobs that are each associated with a product.

Feedback 634: Logs feedback by customer 310 to provide to 3D printing partner 370 and company 380.

Assembly Database 636: Assembly instructions to assemble a product. Additionally, robotic components use the instructions to assemble the received components and the 3D printed components.

3D Printer availability 638: Customer 310 manages their 3D printers, such as when they are booked, by which company, to print which model. Knowing all this information, company 380 determines whether to have customer 310 print the components or outsource the printable components to 3D printing partner 370.

Products database 640: Tracking information of products to be delivered to customer 310 and whether each component is received to assemble the product.

Figure 7:
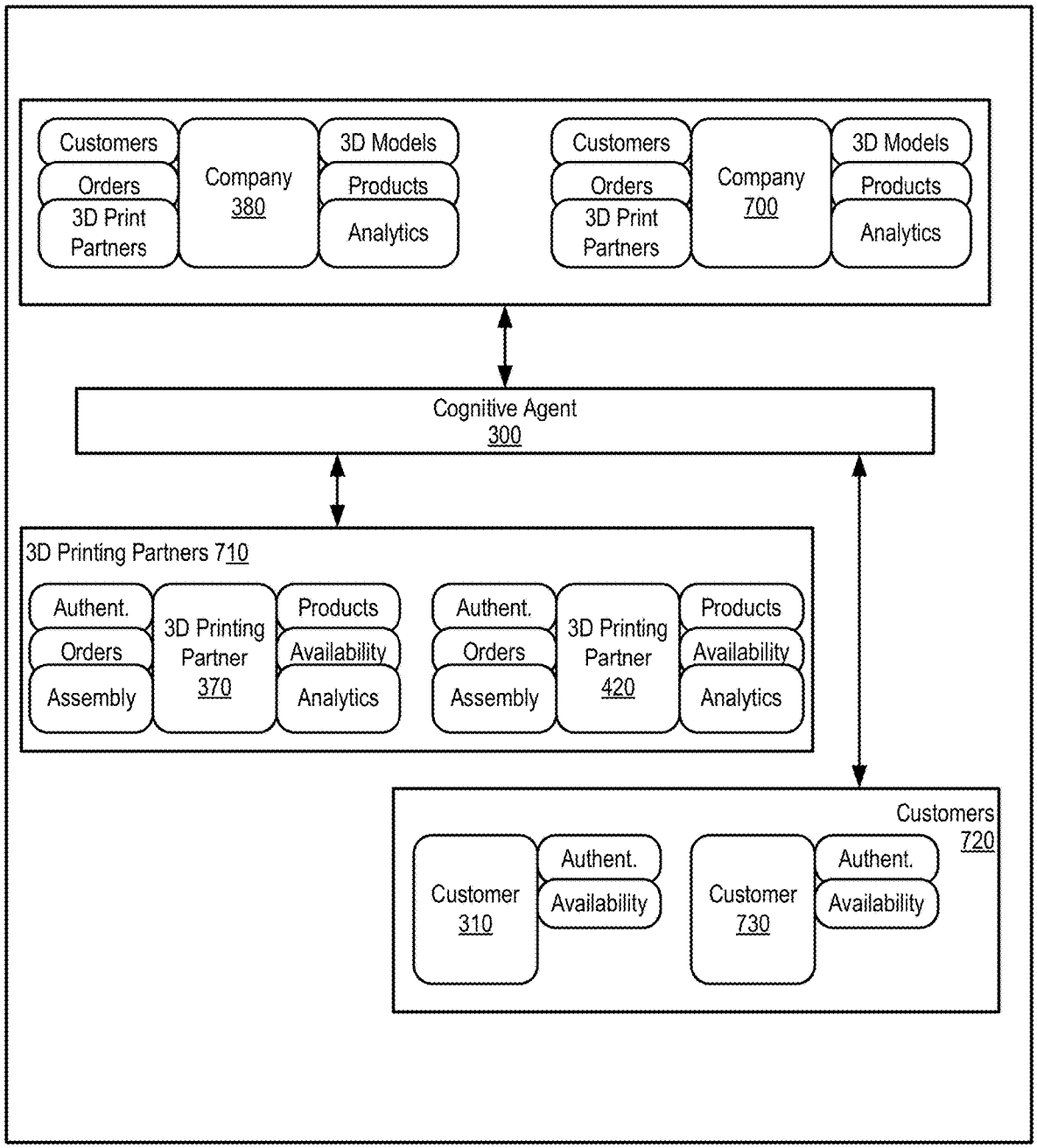
FIG. 7 is an exemplary diagram depicting a cognitive agent interfacing between companies, 3D printing partners, and customers.

FIG. 7 is an exemplary diagram depicting cognitive agent 300 interfacing between companies, 3D printing partners, and customers. Cognitive agent 300, in one embodiment, works as an intermediary between companies, 3D printing partners, and customers to initiate and manage an optimum approach of fulfilling a customer order. Cognitive agent 300 analyzes the product order, identifies printable components, determines a suitable location to print the components, and manages the component production and product assembly phase. Cognitive agent 300 is also aware of events that can influence decisions such as sociopolitical events, environmental events, natural or man-made events, etc.

Cognitive agent 300 receives orders from customers 720, which include customer 310 and customer 730. In one embodiment, the order includes a product that can be obtained from multiple sources, such as from company 380 or company 700. Cognitive agent 300 analyzes both companies and identifies viable 3D printing partners 710, which includes 3D printing partner 370 and 3D printing partner 420. In one embodiment, cognitive agent 300 analyzes various cost/capability combinations of company 380, company 700, 3D printing partner 370, and 3D printing partner 420 to select an optimum solution (see FIG. 9 and corresponding text for further details). In turn, cognitive agent 300 initiates and manages the customer order fulfillment steps to deliver a product to customers 720.

Figure 8:
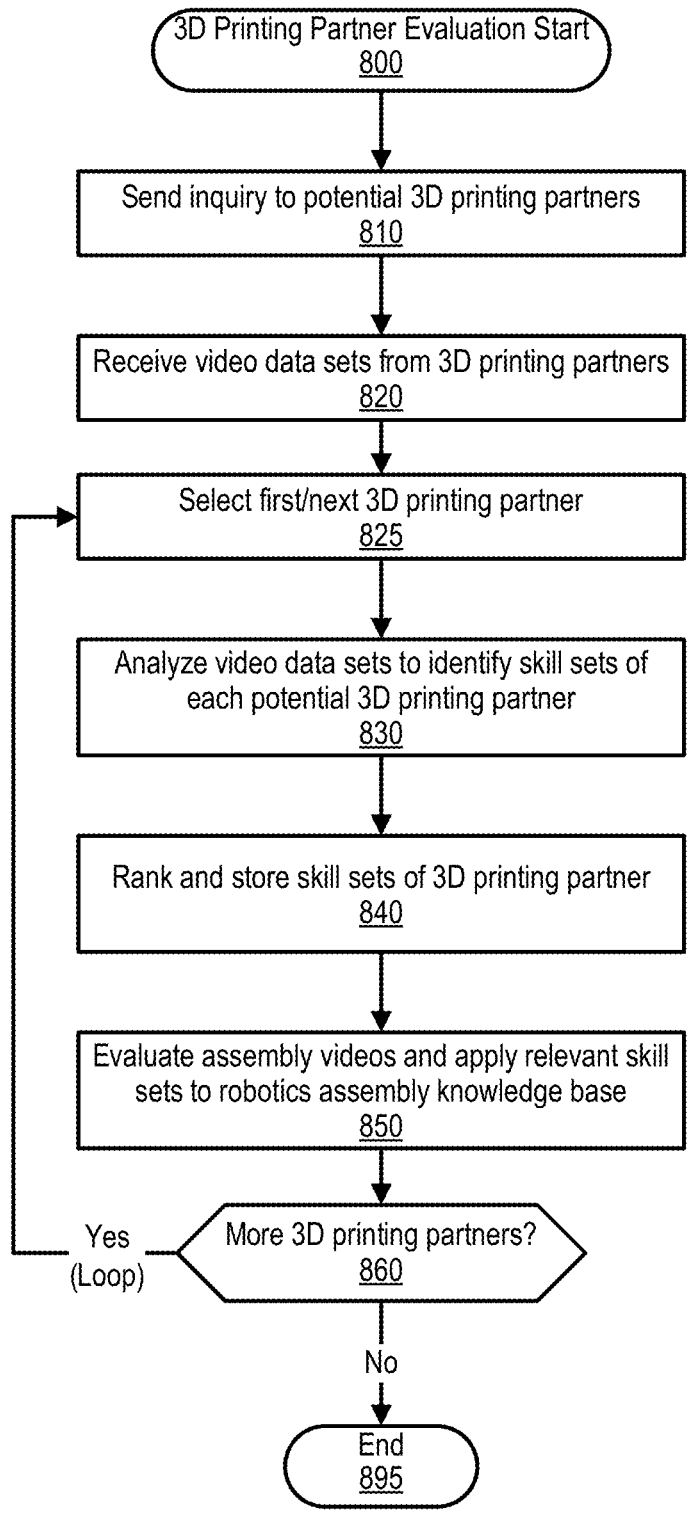
FIG. 8 is an exemplary flowchart depicting steps taken to evaluate a 3D printing partner's assembly skills.

FIG. 8 is an exemplary flowchart depicting steps taken to evaluate a 3D printing partner's assembly skills. FIG. 8 processing commences at 800 whereupon, at step 810, the process sends inquiries to potential 3D printing partners. At step 820, the process receives assembly videos from 3D printing partners and any other relevant assembly skills information (e.g., quality assurance information, years of experience, etc.).

At step 825, the process selects the first 3D printing partner. At step 830, the process analyzes the video data set of the selected 3D printing partner to identify their skill sets. For example, the selected 3D printing partner may have unique tooling or approaches to assemble a server housing. In one embodiment, the process analyzes the video data set using a convolutional neural network along with a long short-term memory (LSTM) artificial recurrent neural network (RNN) architecture used in the field of deep learning to trend the learning over time.

At step 840, the process ranks and stores the skill sets of the selected 3D printing partner. In one embodiment, the process ranks and stores skill sets such as speed of production, customer review ranking, assembly precision, assembly quality, and etcetera. At step 850, in one embodiment, the process evaluates the assembly video data set and applies relevant skill sets to robotics assembly knowledge base, such as skills to connect parts, snapping, screwing, sliding, rotating, gluing, and etcetera.

Figure 9:
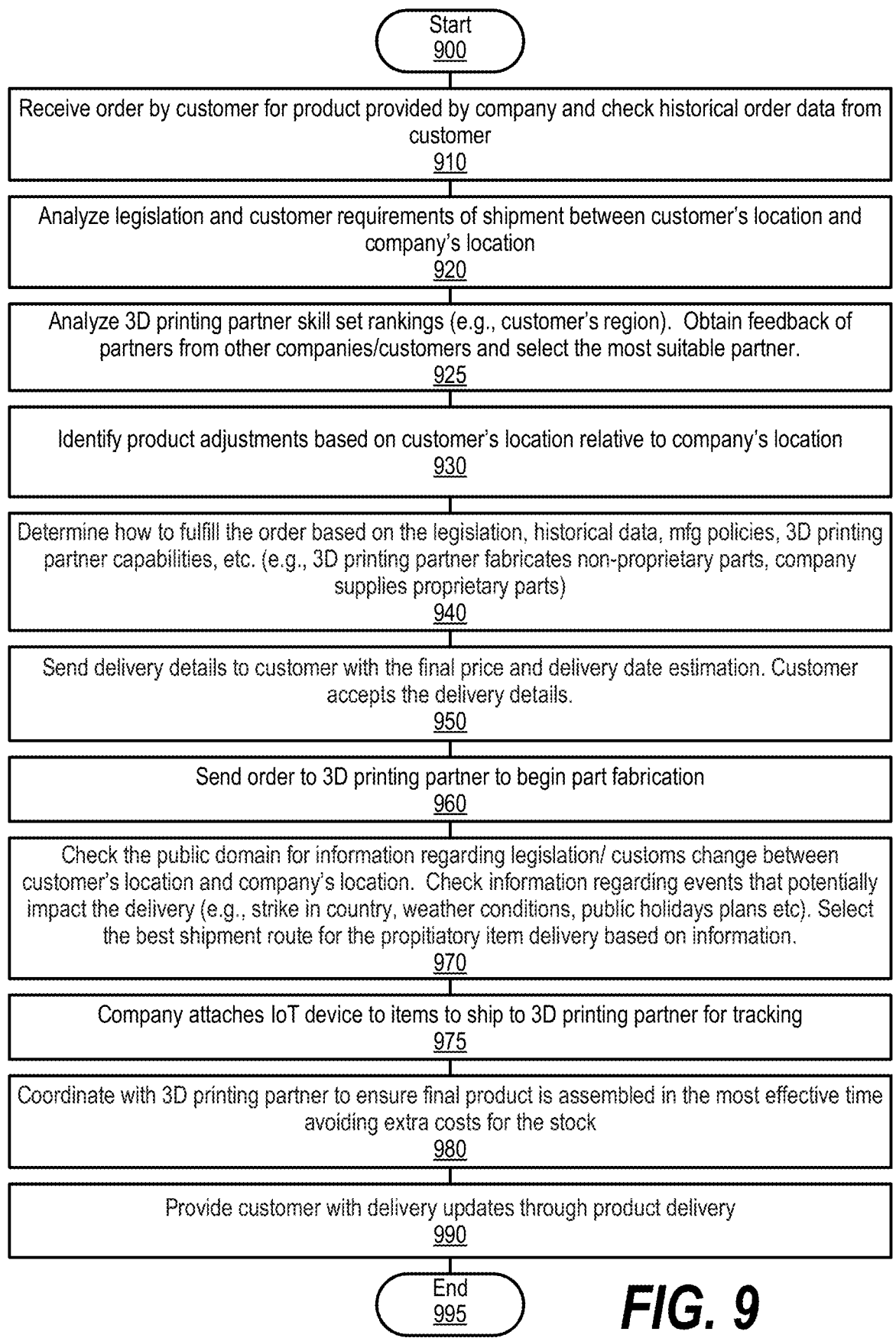
FIG. 9 is an exemplary flowchart depicting steps taken to identify and utilize a suitable 3D printing partner to fabricate, assemble, and ship a product.

A determination is made as to whether there are more 3D printing partners to evaluate (decision 860). In one embodiment, cognitive agent 300 receives video data sets from customers and evaluates the assembly skills of the customers as an option to send printable 3D component orders directly to the customers. If there are more 3D printing partners to evaluate, decision 860 branches to the 'yes' branch, which loops back to select and evaluate the next 3D printing partner (or customer). This looping continues until there are no more 3D printing partners to evaluate, at which point decision 860 branches to the 'no' branch exiting the loop. FIG. 9 processing thereafter ends at 895.

FIG. 9 is an exemplary flowchart depicting steps taken to identify and utilize a suitable 3D printing partner to fabricate printable 3D components, assemble components into a product, and ship the product to a customer. FIG. 9 processing commences at 900 whereupon, at step 910, the process receives an order from a customer for a product. The process identifies the company that typically provides the product and checks historical order data from the customer. At step 920, the process analyzes legislation and customer shipment requirements between the customer's location and the company's location, such as import/export tariffs, shipment bottlenecks, etc.

At step 925, the process analyzes 3D printing partner skill set rankings, such as those in geographical proximity to the customer's region. The skill set rankings are established during the steps shown in FIG. 8. The process obtains 3D partner feedback from other companies/customers and selects the most suitable partner, which may or may not be in the customer's geographical region.

At step 930, the process identifies product adjustments based on the customer's location relative to the company's location. For example, a device that is used in an environment with a large amount of fine particles in the air (e.g., sand) may be altered so the product does not have slots to allow air flow. In this example, internal components may need to be altered to help with internal cooling and printing individual components allows this flexibility.

At step 940, the process determines an optimal order fulfillment approach based on the legislation, historical data, manufacturing policies, 3D printing partner capabilities, etc. For example, a selected 3D printing partner may print non-proprietary components and receive the proprietary components from a company.

At step 950, the process sends delivery details to the customer with a final price and delivery date estimation based on the determined optimal order fulfillment approach. In one embodiment, the process may provide two order fulfillment approaches when requirements conflict, such as a low cost approach and a fast delivery approach. The process receives an agreement from the customer and, at step 960, the process sends the order to the selected 3D printing partner (or customer) to begin part fabrication of the components targeted for 3D printing (e.g., non-proprietary components).

At step 970, the process checks the public domain for information regarding updates to legislation/customs changes between company's location and company's location. The process also checks for information regarding events that potentially impact the delivery (e.g., strike in country, weather conditions, public holidays, etc.). In turn, the process selects the best shipment route to ship the product to the customer.

At step 975, in one embodiment, the company attaches IoT (Internet of Things) devices (e.g., GPS devices, cameras, etc.) to the components (e.g., proprietary components) being shipped to the 3D printing partner for tracking and ships the components. At step 980, the process coordinates with the 3D printing partner to ensure the final product is assembled in the most effective time to avoid extra stocking costs. At step 990, the process provides the company with delivery updates through product delivery. FIG. 9 processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   inputting a plurality of video data sets corresponding to a plurality of 3D printing partners into a cognitive agent comprising an artificial recurrent neural network; ranking, by the cognitive agent, a plurality of skill sets of the plurality of 3D printing partners in response to the artificial recurrent neural network analyzing the plurality of video data sets;
   receiving, from a first entity, a request for a product that comprises a plurality of components; accessing, by the cognitive agent, a parts database in the memory and determining that the plurality of components comprise a set of printable 3D components and a set of non-printable 3D components; selecting, as a second entity, one of the plurality of 3D printing partners based, in part, on the ranked plurality of skill sets; in response to selecting the second entity, transmitting, by the cognitive agent, a set of component instructions comprising a computer aided design (CAD) file over a computer network to the second entity to print the set of printable 3D components; transmitting, by the cognitive agent, an order of the set of non-printable 3D components over the computer network to a third entity;
   in response to the cognitive agent determining a reduction in shipping cost based on the first entity's geographical location, the second entity's geographical location, and the third entity's geographical location:
      transmitting, by the cognitive agent, a request to the third entity over the computer network to ship the non-printable 3D components to the second entity;
      transmitting, by the cognitive agent, a set of assembly instructions over the computer network to the second entity to assemble the product using the set of 3D printable components and the set of non-printable 3D components received by the third entity; and instructing the second entity to package the product and ship the packaged product to the first entity.

2. The method of claim 1 further comprising:
   analyzing a plurality of printing partner geographical locations of the plurality of 3D printing partners relative to the first entity's geographical location; and selecting, as the second entity, one of the plurality of 3D printing partners based, in part, on the analyzing of the plurality of printing partner geographical locations.

3. The method of claim 2 wherein the analyzing comprises evaluation of at least one attribute selected from the group consisting of a tariff cost, a legislation regulation, a manufacturing incentive, the shipping cost, and a stocking cost.

4. The method of claim 1 further comprising:
   instructing the third entity to attach at least one Internet of Things (IoT) device to the non-printable 3D components shipment.

5. An information handling system comprising:
   one or more processors; a memory coupled to at least one of the processors; a set of computer program instructions stored in the memory and executed by at least one of the processors in order to perform actions of:
      inputting a plurality of video data sets corresponding to a plurality of 3D printing partners into a cognitive agent comprising an artificial recurrent neural network;
      ranking, by the cognitive agent, a plurality of skill sets of the plurality of 3D printing partners in response to the artificial recurrent neural network analyzing the plurality of video data sets; receiving, from a first entity, a request for a product that comprises a plurality of components; accessing, by the cognitive agent, a parts database in the memory and determining that the plurality of components comprise a set of printable 3D components and a set of non-printable 3D components;
      selecting, as a second entity, one of the plurality of 3D printing partners based, in part, on the ranked plurality of skill sets; in response to selecting the second entity, transmitting, by the cognitive agent, a set of component instructions comprising a computer aided design (CAD) file over a computer network to the second entity to print the set of printable 3D components;
      transmitting, by the cognitive agent, an order of the set of non-printable 3D components over the computer network to a third entity; in response to the cognitive agent determining a reduction in shipping cost based on the first entity's geographical location, the second entity's geographical location, and the third entity's geographical location:
         transmitting, by the cognitive agent, a request to the third entity over the computer network to ship the non-printable 3D components to the second entity;
         transmitting, by the cognitive agent, a set of assembly instructions over the computer network to the second entity to assemble the product using the set of 3D printable components and the set of non-printable 3D components received by the third entity; and instructing the second entity to package the product and ship the packaged product to the first entity.

6. The information handling system of claim 5 wherein the processors perform additional actions comprising:
   analyzing a plurality of printing partner geographical locations of the plurality of 3D printing partners relative to the first entity's geographical location; and selecting, as the second entity, one of the plurality of 3D printing partners based, in part, on the analyzing of the plurality of printing partner geographical locations.

7. The information handling system of claim 6 wherein the analyzing comprises evaluation of at least one attribute selected from the group consisting of a tariff cost, a legislation regulation, a manufacturing incentive, the shipping cost, and a stocking cost.

8. The information handling system of claim 5 wherein the processors perform additional actions comprising:
   instructing the third entity to attach at least one Internet of Things (IoT) device to the non-printable 3D components shipment.

* * * * *